Dec. 20, 1938.  H. NUTT  2,141,014
CLUTCH PLATE
Filed April 17, 1936  2 Sheets-Sheet 1
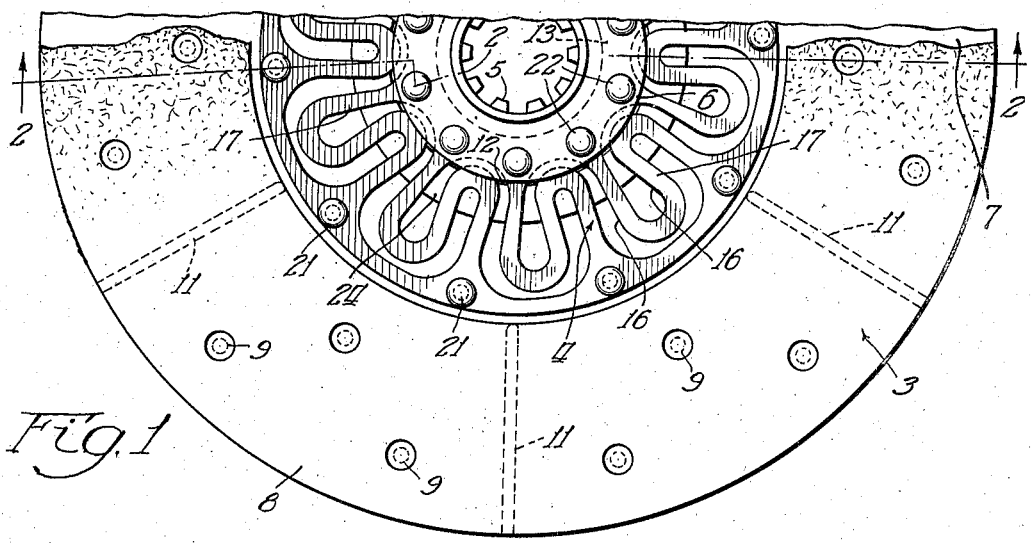
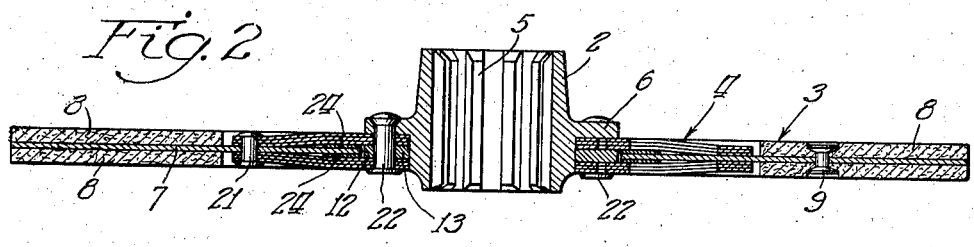
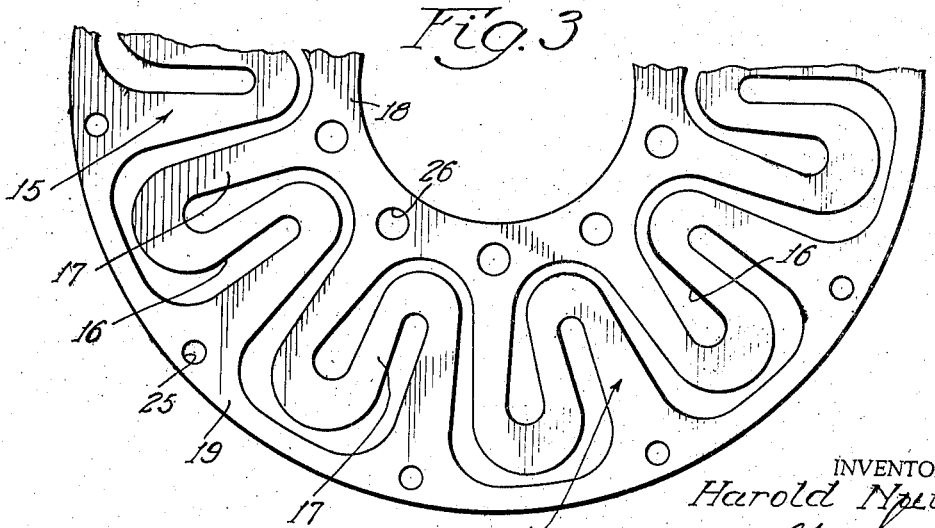
INVENTOR.
Harold Nutt.
BY
ATTORNEY.

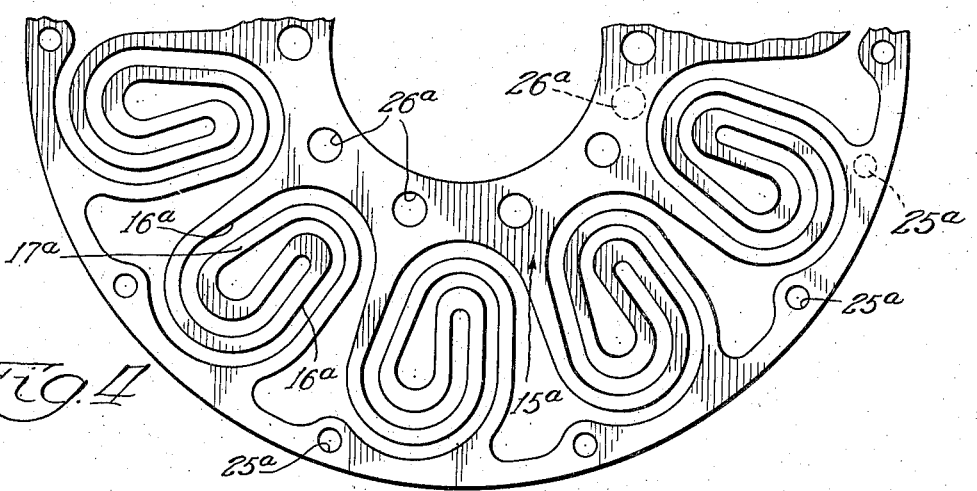
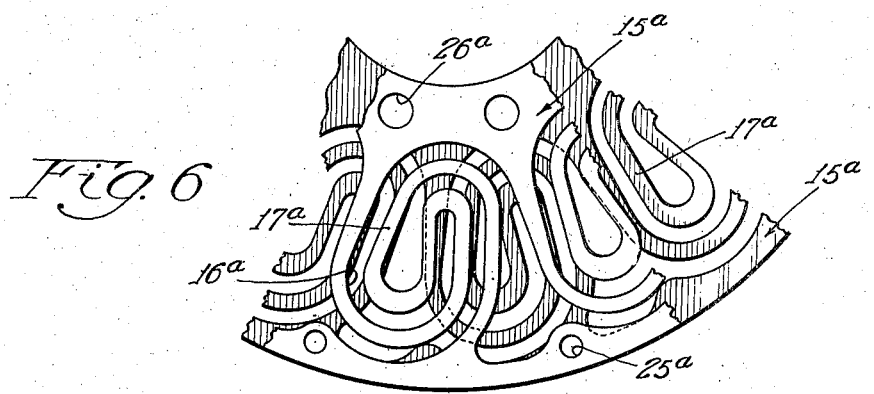
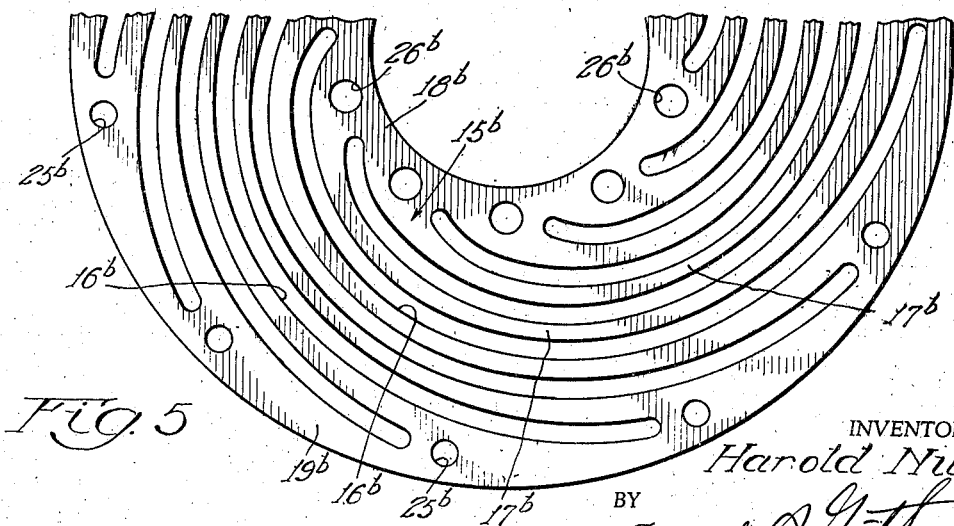

Patented Dec. 20, 1938

2,141,014

UNITED STATES PATENT OFFICE 2,141,014

CLUTCH PLATE

Harold Nutt, Chicago, Ill., assignor to Borg-Warner Corporation, Chicago, Ill., a corporation of Illinois Application April 17, 1936, Serial No. 74,878

12 Claims. (Cl. 192—68)

This invention relates to improvements in clutch plates, and more particularly to friction clutch plates of the type wherein means are provided in the clutch plate assembly for the dampening of vibration.

Numerous torsional dampening means have been proposed for use in the driven plate assembly of motor vehicle friction clutches in the past and many have operated successfully to reduce or eliminate the noises due to vibration of the torque transmitting parts of the vehicle power transmission drive.

It is an object of my present invention to provide an improved clutch plate for such clutches, having a torsional dampener which is extremely simple in construction and in which the entire dampener assembly may be manufactured and incorporated in the clutch plate at lower cost than those heretofore proposed.

Another object is to provide an improved clutch plate having a torsional dampener assembly having relatively high torque transmitting capacity, but which occupies a relatively small space.

A further object is to provide an improved clutch plate having a torsional dampener wherein accidental displacement of the dampener parts, as during operation, cannot occur.

A further object is to provide an improved clutch plate of the torsional dampener type which though possessed of relatively high torque-transmitting characteristics, presents the proper resiliency for efficient dampening during the transmission of torque therethrough.

Other objects, the advantages and uses, of the invention will become apparent after reading the following specification and claims, and after consideration of the drawings forming a part of the specification, wherein Fig. 1 is a fragmentary elevation of a friction clutch plate constructed in accordance with my invention;

Fig. 2 is a sectional view along the line 2—2 of Fig. 1;

Figs. 3, 4 and 5 are fragmentary elevations of modified forms of the resilient torsional dampener cushions, and Fig. 6 is a fragmentary elevation illustrating a modified arrangement in the assembly of the resilient dampener cushions.

With reference to Figs. 1 and 2, my improved clutch plate may comprise in general a hub member 2, a friction facing assembly 3 and a torsional dampening cushion assembly 4 drivingly interposed between the hub and facing assembly, thus to provide torsional resiliency in the driving connection thus established therebetween.

The hub 2 may be formed with splines 5 for engagement with the transmission shaft, and is preferably formed with an integral flange 6 to which the inner peripheral portion of the cushion assembly may be secured, as by rivets.

The friction facing assembly 3 may comprise a steel plate 7 mounted concentrically with the hub member 2 and in parallel relationship with the flange 6. Annular friction facings 8 may be fixed, as by rivets 9, to the opposite sides of the outer peripheral portion of the plate 7. If desired this portion of the plate 7 may be radially slotted as indicated at 11 to increase the flexibility of the plate and to divide the facing supporting portions thereof into sectors. The circular opening 12 in the center of the plate 7 is preferably formed with a diameter slightly greater than the outside diameter of the hub flange 6. A ring or collar 13, of greater thickness than the plate 7, may be interposed between the adjacent wall of the hub and the wall of the plate opening 12, at one side of the hub flange 6, thus to centrally locate the plate about the axis of the hub 2.

The torsional dampener cushion assembly 4 is preferably formed of a plurality of annular steel cushion discs 15 having a plurality of slots 16 stamped therein forming convoluted spoke portions 17 between the inner and outer peripheral portions 18 and 19, respectively. I have illustrated in Fig. 3 one such stamping in which the spoke portions 17 are formed by punching substantially S-shaped slots through the intermediate body portion of the cushion thereby producing spokes which are substantially S-shaped in contour. A cushion thus formed possesses appreciable torsional resiliency, i. e., capability to permit slight relative rotational movement between the inner and outer peripheral portions of the cushion through the edgewise flexing of the spokes 17.

In Figs. 1 and 2 I have illustrated six of the annular cushion members 15 which are secured at their outer portions 19 to the plate 7, three on each side of the plate, by rivets 21. The cushion members 15 overlap the inner portion of the plate 7 and the rivets 21 are disposed at a point adjacent to the inner edges of the facings 8. The inner portions 18 of the spring cushions are secured, by rivets 22, to the flange 6 of the hub 2, three of the cushions being on each side of the ring 13. Friction rings 24 may be disposed one on each side of the plate 7, thus to dampen relative movement between the plate 7 and the inner portions of the cushions. The aggregate thickness of the friction rings 24 and plate 7 may approximate the thickness of the ring 13. Suitable openings 25 and 26 are punched through the cushion members 15 through which the rivets 21 and 22 respectively may pass.

A clutch plate constructed as herein described comprises a compact unit assembly in which relative rotation between the friction facings 8 and the hub 2 may take place due to the torsional resiliency of the intermediate torsional dampener assembly 4. Since the cushions 15 forming the yielding part of the dampener assembly are rigidly fixed at their inner and outer portions to the hub flange 6, and plate 7, respectively, any noise which might otherwise occur through vibration of the parts, is precluded during clutch operation and accidental displacement of the parts is likewise precluded.

The cushion members 15, of which the laminated dampener assembly is formed, while not only capable of yielding under torsional stress, possess sufficient lateral flexibility so as to assure perfect alignment between the facings and the cooperating driving parts of a complete clutch assembly. This feature is one not ordinarily attributable to the torsional dampener, per se, of a clutch plate.

Obviously the torque transmitting characteristics of the dampener assembly may be increased or decreased by changing the number of the cushion stampings 15 comprising the dampener assembly, the relative torsional resiliency of each cushion member remaining constant. In the past, such changes in torque-transmitting characteristics have been carried out by substituting coil springs of one compression factor for similar springs of another compression factor. According to my invention a single stamping only need be formed, the number used being determinable by torque transmitting requirements.

One of the outstanding features of the clutch plate described herein is the relatively high torque transmitting characteristic of the torsional dampener assembly per unit of size. The dampener assembly occupies less space than those proposed and adapted for use in the past to any given value of torque transmitting capacity. This advantage is attained without sacrifice of required torsional resiliency.

In Fig. 4 I have illustrated another form of the dampener cushion stamping as indicated at 15ᵃ. This form differs from that illustrated in Fig. 3 only by a change in the contour of the slots 16ᵃ which are such as to cause an increase in the length of the convoluted spoke portions 17ᵃ. For this purpose the slots 16ᵃ present an interlocking relationship, one with another, so as to cause the spoke portions to double back from themselves four times. It is contemplated that this cushion member will provide a higher degree of resiliency under torsional stress than the one illustrated in Fig. 3, the thickness of the sheets from which the stampings are made being equal. The application of the cushion members 15ᵃ to the clutch plate is the same as that described in connection with Figs. 1 to 3 inclusive.

In Fig. 5 I have illustrated another form of the cushion stamping in which the spoke members 17ᵇ are formed in the cushion member 15ᵇ by the provision of a plurality of overlapping spiral slots 16ᵇ terminating at opposite ends in the inner and outer peripheral portions 18ᵇ and 19ᵇ respectively of the stamping, at points circumferentially displaced. This type of cushion member is capable of transmitting relatively high torque and may be formed by relatively simple dies.

In Fig. 6 I have illustrated a modified arrangement of assembly of the cushion members 15ᵃ relative to the hub and facing plate. Instead of placing the several cushion stampings 15ᵃ with their spokes 17ᵃ in register one with another, alternate cushion members are arranged with their spokes staggered, thus to distribute with greater uniformity the transmission of torque from the facing supporting assembly to the hub. For this purpose the openings 25ᵃ and 26ᵃ on certain of the cushion members 15ᵃ are shifted circumferentially to align with the openings 25ᵃ and 26ᵃ in the adjacent plate. For purpose of illustration I have indicated in dotted lines in Fig. 4 the position of such shifted openings on the cushion member illustrated therein.

While I have illustrated and described herein certain specific forms of the dampener cushion, it is apparent that many changes in contour and arrangement of the cushion spokes and disposition of the parts forming the dampener cushion lamination may be carried out without departing from the spirit and scope of the invention as defined in the appended claims.

I claim:

1. A clutch plate comprising, a hub, a friction facing assembly disposed concentrically about the axis of said hub, and an annular resilient cushion interposed between said hub and said friction facing assembly and arranged yieldingly to transmit torque therebetween, said cushion being formed of relatively thin flat and yieldable metal stampings having slots therethrough whereby to provide a plurality of spoke portions extending from the inner peripheral portion of the annular cushion to the outer peripheral portion thereof, said spoke portions having such circumferential yieldability as to constitute said cushion a torsional vibration dampener.

2. A clutch plate comprising, a hub, a friction facing assembly disposed concentrically about the axis of said hub, and an annular resilient cushion interposed between said hub and said friction facing assembly and arranged yieldingly to transmit torque therebetween, said cushion being formed of yieldable sheet metal and having slots therethrough whereby to provide a plurality of spoke portions extending from the inner peripheral portion of the annular cushion to the outer peripheral portion thereof, thus to provide torsional resiliency, said spoke portions having such circumferential yieldability as to constitute said cushion a torsional vibration dampener.

3. A clutch plate comprising, a hub, a friction facing assembly disposed concentrically about the axis of said hub, and an annular resilient cushion interposed between said hub and said friction facing assembly and arranged yieldingly to transmit torque therebetween, said cushion comprising a plurality of annular flat sheet steel stampings each having relatively narrow slots therethrough forming a plurality of non-radially disposed spoke portions extending between the inner and outer peripheral portions of said stampings.

4. A clutch plate comprising, a hub, a friction facing assembly disposed concentrically about the axis of said hub, and an annular resilient cushion interposed between said hub and said friction facing assembly and arranged yieldingly to transmit torque therebetween, said cushion comprising a plurality of flat steel stampings each having convoluted spoke portions connecting the inner and outer peripheral portions thereof.

5. A clutch plate comprising, a hub, a friction facing assembly disposed concentrically about the axis of said hub, and torsional dampening means interposed between said facing assembly and said hub, said means comprising a plurality of annular metal cushions each fixed at its inner and outer peripheral portions to said hub and said facing assembly respectively, the intermediate portions of each of said cushions having the form of relatively narrow, closely spaced non-radially disposed spokes.

6. A clutch plate comprising, a hub, a friction facing assembly disposed concentrically about the axis of said hub, and torsional dampening means interposed between said facing assembly and said hub, said means comprising a plurality of annular metal cushions each fixed at its inner and outer peripheral portions to said hub and said facing assembly respectively, the intermediate portions of each of said cushions having the form of convoluted spokes.

7. A clutch plate comprising, a hub, a friction facing assembly disposed concentrically about the axis of said hub, and torsional dampening means interposed between said facing assembly and said hub, said means comprising a plurality of relatively thin flat annular metal cushions each fixed at its inner and outer peripheral portions to said hub and said facing assembly respectively, the intermediate portions of each of said cushions having the form of relatively narrow, closely spaced non-radially disposed spokes, the spokes of certain of said cushions being staggered with respect to the spokes of certain other of said cushions.

8. A clutch element comprising a hub, a friction facing assembly including spaced friction facings and an annular mounting member on which said facings are mounted, said mounting member projecting radially inwardly of the inner radial extremities of said facings, and torsional dampening means interposed between said hub and said mounting member, said dampening means comprising flat annular cushions of stamped spring sheet metal receiving said mounting member between them and each having its inner and outer peripheral regions secured to said hub and mounting member respectively, the intermediate regions of said cushions comprising circumferentially yieldable spokes.

9. A clutch element comprising a hub, a friction facing assembly including spaced friction facings and mounting means on which said facings are carried, said mounting means extending radially inwardly of the inner radial extremities of said friction facings, and torsional dampening means interposed between said hub and said mounting means, said dampening means comprising flat annular cushions of stamped spring sheet metal receiving said mounting means between them and each having its inner and outer peripheral regions secured to said hub and mounting means respectively, the intermediate regions of said cushions comprising circumferentially yieldable spokes.

10. A clutch element comprising a hub, a friction facing assembly including spaced friction facings and mounting means on which said facings are carried, said mounting means extending radially inwardly of the inner radial extremities of said friction facings substantially to the hub, and torsional dampening means interposed between said hub and said mounting means, said dampening means comprising flat annular cushions of stamped spring sheet metal receiving said mounting means between them and each having its inner and outer peripheral regions secured to said hub and mounting means respectively, the intermediate regions of said cushions comprising circumferentially yieldable spokes.

11. A clutch plate comprising a hub, a friction facing assembly disposed concentrically about the axis of said hub, and torsional dampening means comprising an annular resilient cushion interposed between said hub and said friction facing assembly and arranged to yieldingly transmit torque therebetween, said cushion comprising a plurality of spring sheet metal stampings having relatively narrow slots therethrough forming a plurality of relatively narrow circumferentially yieldable spoke portions extending from the radially inner to the radially outer region of the cushion.

12. A clutch plate comprising a hub, a friction facing assembly disposed concentrically about the axis of said hub, and torsional dampening means comprising an annular resilient cushion interposed between said hub and said friction facing assembly and arranged to yieldingly transmit torque therebetween, said cushion comprising a plurality of spring sheet metal stampings having continuous annular regions at its inner and outer radial extremities and formed with a plurality of circumferentially yieldable spoke portions connecting said inner and outer regions.

HAROLD NUTT.